(12) United States Patent
Lauber et al.

(10) Patent No.: US 9,964,947 B2
(45) Date of Patent: May 8, 2018

(54) WARNING MESSAGE WITH RESPECT TO THE USE OF HEAD-MOUNTED DISPLAYS IN A VEHICLE

(71) Applicant: Bayerische Motoren Werke Aktiengesellschaft, Munich (DE)

(72) Inventors: Felix Lauber, Munich (DE); Wolfgang Haberl, Munich (DE); Mehdi Farid, Munich (DE); Wolfgang Spiessl, Pfaffenhofen (DE)

(73) Assignee: Baterische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 15/140,078

(22) Filed: Apr. 27, 2016

(65) Prior Publication Data

US 2016/0239020 A1    Aug. 18, 2016

Related U.S. Application Data

(63) Continuation of application No. PCT/EP2014/071117, filed on Oct. 2, 2014.

(30) Foreign Application Priority Data

Oct. 28, 2013  (DE) .................. 10 2013 221 855

(51) Int. Cl.
*G05D 1/00* (2006.01)
*B60K 28/02* (2006.01)
*E05F 15/77* (2015.01)

(52) U.S. Cl.
CPC ........... *G05D 1/0016* (2013.01); *B60K 28/02* (2013.01); *E05F 15/77* (2015.01); *E05Y 2900/531* (2013.01); *E05Y 2900/55* (2013.01)

(58) Field of Classification Search
CPC ....... G05D 1/0016; E05F 15/77; B60K 28/02; E05Y 2900/531; E05Y 2900/55
See application file for complete search history.

(56) References Cited

U.S. PATENT DOCUMENTS 9,697,465 B2 * 7/2017 Li ........................... G06N 5/048
9,760,698 B2 * 9/2017 Pisz ....................... G06F 21/31
(Continued)

FOREIGN PATENT DOCUMENTS

DE      10 2012 201 513 A1    8/2013
EP             1 990 674 A1   11/2008
WO      WO 2012/102085 A1     8/2012

OTHER PUBLICATIONS

International Search Report (PCT/ISA/210) issued in PCT Application No. PCT/EP2014/071117 dated Jan. 29, 2015, with English translation (four (4) pages).
(Continued)

*Primary Examiner* — Nicholas Kiswanto
(74) *Attorney, Agent, or Firm* — Crowell & Moring LLP

(57) ABSTRACT

A device for a vehicle is disclosed, including: a transmitting and receiving unit for wireless data transmission; an electronic computing unit which is operatively coupled to the transmitting and receiving unit; wherein the computing unit is configured to execute: Receiving of radio signals from data glasses using the transmitting and receiving unit, from which glasses no signals had previously been received; recognition that the data glasses are in use relative to the vehicle, including recognition of a temporal relation between an operation of the vehicle and the reception of radio signals of the data glasses, wherein the operation of the vehicle includes in particular the unlocking of the vehicle, the movement of windows of the vehicle, the opening of a door of the vehicle, or the activation of operating elements
(Continued)

of the vehicle: In response to the recognition of the temporal relation, execution of a specified function.

13 Claims, 1 Drawing Sheet

(56) References Cited

U.S. PATENT DOCUMENTS

| | | |
|---|---|---|
| 2013/0147686 A1 | 6/2013 | Clavin et al. |
| 2013/0304308 A1 | 11/2013 | Maruyama et al. |
| 2015/0015386 A1 | 1/2015 | Langenhan |

OTHER PUBLICATIONS

German Search Report issued in counterpart German Application No. 10 2013 221 855.9 dated Mar. 6, 2014, with partial English translation (eight (8) pages).

* cited by examiner

WARNING MESSAGE WITH RESPECT TO THE USE OF HEAD-MOUNTED DISPLAYS IN A VEHICLE

CROSS REFERENCE TO RELATED APPLICATIONS

This application is a continuation of PCT International Application No. PCT/EP2014/071117, filed Oct. 2, 2014, which claims priority under 35 U.S.C. § 119 from German Patent Application No. 10 2013 221 855.9, filed Oct. 28, 2013, the entire disclosures of which are herein expressly incorporated by reference.

BACKGROUND AND SUMMARY OF THE INVENTION

The invention relates to a device for motor vehicles which is used to warn against the use of data glasses in the vehicle.

Nowadays, data glasses, also referred to as "smart glasses" or "head-mounted displays", which data glasses include a display, are known. Data glasses are worn on the head by a user in a manner similar to conventional glasses, which are used as a visual aid. The display of the data glasses is located in the field of view of the wearer. Some data glasses have a display for only one eye, other data glasses have two partial displays, wherein each eye is assigned a partial display.

Furthermore, it is known that data glasses can have a semitransparent display. Such a display makes it possible for the wearer to detect both displayed information and also the environment behind the display. This type of display is particularly well suited to the representation of information in a manner similar to analog contact. Data glasses, the display of which is not located in the central field of view of the wearer, have been disclosed.

Frequently, data glasses have transmitting and receiving units for wire-free data transmission. Typically, these are components for the use of WLAN (sometimes also called Wi-Fi), Bluetooth or components according to one or more of the mobile radio standards 3GPP, LTE or subsequent standards.

Irrespective of whether the display of data glasses is or is not arranged in the central field of view, the depictions on the display of the data glasses potentially constitute a diversion from other activities. This is true in particular when the wearer of the data glasses is guiding a vehicle as a driver. Here, as a result of communications or graphics which pop up unexpectedly, the attention of the driver can be diverted from his driving task, which threatens traffic safety.

In the case of a display of data glasses which is located in the central field of view of the driver, it is even possible for the view of the driver of the traffic situation to be hampered by depictions from the data glasses. This likewise threatens traffic safety.

In order to warn the driver of a vehicle against the risks of wearing data glasses, it is contemplated to apply stickers in the vehicle which warn against these risks. However, the spread of data glasses amongst the drivers of motor vehicles is currently still relatively low, so that the warning would be irrelevant to most drivers and would represent a source of visual interference.

The object on which the invention is based is thus to warn against the use of data glasses only when there is actually the danger that the driver of a vehicle could be wearing data glasses.

This and other objects are achieved by a device for a vehicle, a method of operating the device, and a correspondingly equipped vehicle, according to embodiments of the invention.

In one aspect, a device for a vehicle includes: a transmitting and receiving unit for wire-free data transmission; an electronic computing unit, which is operatively coupled to the transmitting and receiving unit; wherein the device is configured as follows: with the aid of the transmitting and receiving unit, receiving radio signals from the data glasses from which no signals had previously been received; detecting the fact that the data glasses are in use relative to the vehicle, including: detecting a temporal relationship between an operation of the vehicle and the reception of radio signals from the data glasses, wherein the operation of the vehicle includes in particular the unlocking of the vehicle, the movement of windows of the vehicle, the opening of a door of the vehicle or the actuation of operating elements of the vehicle; in response to the recognition of the reference: executing a predetermined function. Optionally, the method can also explicitly comprise the detection that these are radio signals from data glasses. The transmitting and receiving unit can be a WLAN module, in particular a hotspot, a Bluetooth module or a station for mobile data transmission in accordance with the 3GPP, LTE or subsequent standards. The data glasses have corresponding devices for wire-free data transmission.

It is thus made possible to warn the driver of a vehicle against the danger of using the data glasses only when data glasses could actually be used. The identification of situations in which data glasses could be used in the vehicle is done via the temporal relationship between an operation of the vehicle and the reception of signals from the data glasses for the first time or after a reception of said signals occurring again after a non-reception. If both events occur simultaneously or one after the other after an acceptable time offset (smaller than a threshold value, for example 10 seconds or 2 min), then there is a high probability that the data glasses are being worn by the driver or another passenger in the vehicle and are brought into the vicinity of the vehicle in such a way that a radio link can be made. In such a situation, the output of a warning message for example would be appropriate. Such an output of a warning message is an example of a function. If, on the other hand, it cannot be assumed that there is any indication that data glasses are brought into the vehicle, the output of a warning message then also appears to be unnecessary and would disturb the driver.

In a particular development, the reception of radio signals comprises: detecting information in the radio signals which indicates that the radio signals originate from data glasses; wherein the information in the radio signals corresponds in particular to a radio protocol.

The detection or determination that the radio signals are radio signals from data glasses can be done by using an address (for example an MAC address of a WLAN unit) of the transmitting and receiving unit of the data glasses, and allocating the address to a product or manufacturer or to a device class by using a list which provides a link between addresses and products, manufacturers or device classes. By using information relating to the device class, which is provided in the transmission protocol used, or which is communicated by the data glasses in response to a request from the device according to the invention, provision can also be made to make the determination that data glasses are involved.

In a preferred development, the detection that the data glasses are in proximity to the vehicle comprises: determining the distance and/or position of the data glasses in relation to the vehicle with the aid of the signal strength of the radio signals by the transmitting and receiving unit; wherein the transmitting and receiving unit in particular comprises a plurality of antennas at different positions, with the aid of which the signal strength and/or the direction of origin of the radio signals can be determined. Thus, location or only a determination of distance by using the signal strength of the data glasses is proposed. This information is taken into account in order to detect the proximity of the data glasses to the vehicle. If appropriate, it is also possible to detect the direction in which the data glasses move, whether they move toward the vehicle or away from the vehicle. These are further indications that the driver of the vehicle is wearing the data glasses.

In a further development, the function includes: causing the output of a message by an output device, in particular by a display and/or loudspeaker; receiving information via an input by a user into an input device; receiving an input as a response to the message; checking whether the input satisfies a predetermined condition; as long as the input does not satisfy the predetermined condition: preventing a further function, in particular preventing specific types of data transmissions from the vehicle to the data glasses or preventing the starting of the internal combustion engine of the vehicle. If, therefore, it has been established that the user is bringing data glasses into the vehicle, the user can be given a warning message and the driver can be requested not to use the data glasses. This warning message can accompany a request in which the driver confirms that he will not wear the data glasses. Only then is it possible, for example, to authorize the transmission of entertainment data such as videos or news services from the Internet by the transmitting and receiving unit of the device according to the invention which is installed in the vehicle. This is intended to prevent the driver from wearing the data glasses while, at the same time, permitting the use of the data glasses by other passengers in the vehicle. Provision can likewise be made to make the starting of the internal combustion engine of the vehicle dependent on the confirmation that the driver is not wearing the data glasses.

In a preferred development, the input includes bringing the data glasses into the transmission range of a close-range communication device, sometimes also called near-field communication or NFC. In this case, the data glasses have a module for NFC communication with a corresponding mating element (an NFC chip) in the vehicle. Communication between the two NFC modules takes place only when the NFC chip of the data glasses is sufficiently close to the NFC module of the vehicle, for example closer than 10 cm. It is then possible to arrange the NFC chip of the vehicle at a point in the vehicle interior which can be reached (comfortably) only from the seats for passengers and not from the driver's seat. As a result of bringing the data glasses close to the NFC chip of the vehicle, it is confirmed that the data glasses are being used by a passenger and the data transmission from entertainment data to these data glasses can be enabled.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
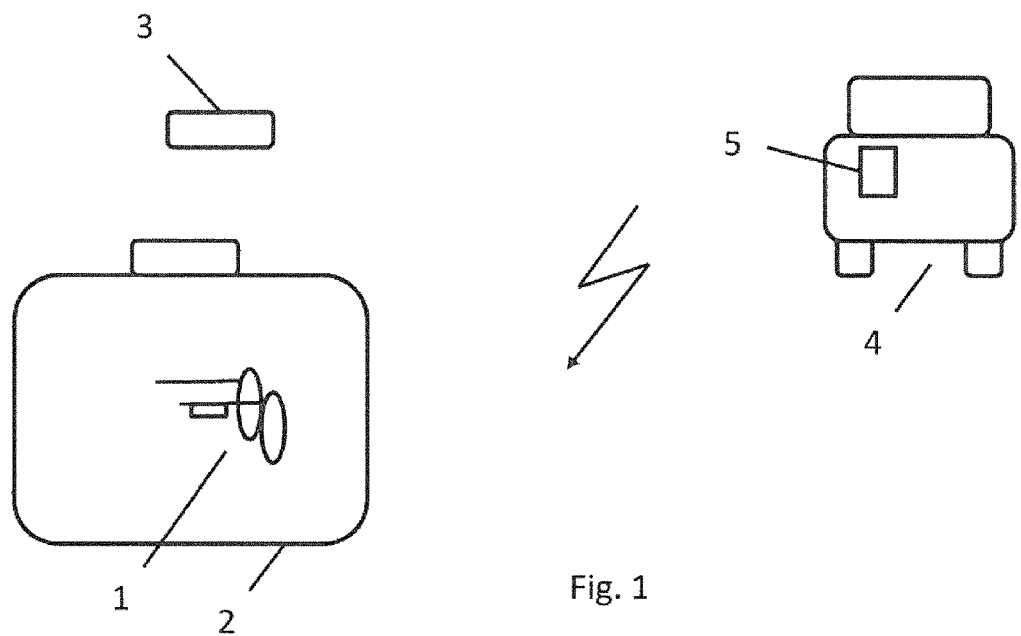
FIG. 1 shows, schematically, a typical situation in which the device according to an embodiment of the invention is used.

FIG. 1 shows, schematically, a typical situation in which an exemplary device is used. A future driver (not shown) of the vehicle 4 approaches the vehicle 4 and in the process carries with him a pouch 2 with data glasses 1 located therein. Likewise, the driver carries the radio key 3 of the vehicle 4 with him. During the approach to the vehicle 4, the driver actuates the radio key 3 and therefore unlocks the vehicle 4. The vehicle 4 has a transmitting and receiving unit 5 for Bluetooth. Likewise, the data glasses 1 have a transmitting and receiving unit for Bluetooth. During the approach of the driver to the vehicle 4, these two transmitting and receiving units produce a radio link, in which the data glasses 1 and the vehicle 4 are identified. In some implementations, the vehicle 4 sends an explicit request to the data glasses 1 to identify themselves or to indicate the device class. This can be provided in particular when the connection protocol per se or the address of the data glasses does not provide or permit any indication of the device class or the like.

The data glasses 1 and the vehicle 4 have therefore also made radio contact before the data glasses 1 are located in the vehicle 4. Setting up this radio contact in the present example even takes place some seconds before the vehicle 4 is unlocked with the key 3. The vehicle 4 records the time at which the unlocking command from the key 3 was received and the radio link to the data glasses 1 was made. If the two times are less than 5 s or, for example, also less than 1 min apart from each other, then a relationship with the data glasses 1 to the vehicle 4 is established. As a result, the driver is provided with a warning message on a display of the vehicle 4 that the data glasses must not be worn by the driver during the journey and that a data link for entertainment data which is offered by the vehicle can be made only when the driver confirms the non-use of the data glasses. If the driver then confirms the non-use of the data glasses, the data link for entertainment data is authorized. Otherwise, the transmission of entertainment data is suppressed.

Figure 2:
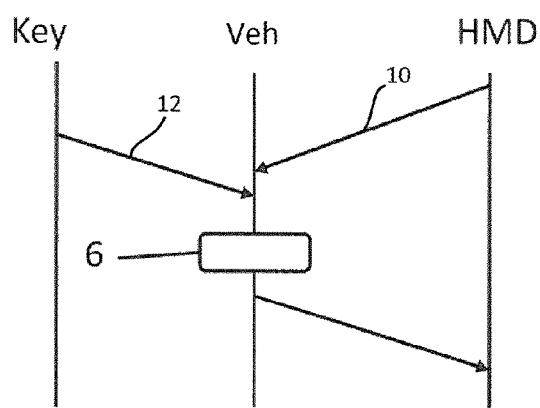
FIG. 2 shows, schematically, a flowchart of signal transmissions to the device in accordance with an exemplary embodiment.

FIG. 2 shows, schematically, the time sequence of the radio transmissions between vehicle key "Key", the vehicle "Veh" and the data glasses "HMD" during an approach of the driver to the vehicle. First, the radio link 10 to the data glasses is made, whereupon, shortly thereafter, the unlocking command 12 from the key is received. In step 6, the vehicle displays the warning message, which is confirmed by the driver, so that a data transmission for entertainment information to the data glasses is authorized. The confirmation by the driver is made via an input on operating elements of the vehicle. However, it is also contemplated that the confirmation is not made by the driver of the vehicle but as a result of the fact that the data glasses are held close to an NFC chip in the vicinity of one of the seats for passengers. This is likewise detected as confirmation, and the data transmission can be enabled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a vehicle device having a transmitting and receiving unit for wire-free data transmission and an electronic computing unit operatively coupled to the transmitting and receiving unit, the method comprising the acts of:
   receiving, via the transmitting and receiving unit, radio signals from data glasses, wherein no radio signals from the data glasses had previously been received;
   recognizing that the data glasses are in use relative to the vehicle, further comprising:
   detecting, via the electronic computing unit, a temporal relationship between an operation of the vehicle and the receiving of the radio signals from the data glasses, wherein the operation of the vehicle comprises one or more of: an unlocking of the vehicle, movement of windows of the vehicle, an opening of a door of the vehicle or an actuation of operating elements of the vehicle; and
   in response to the detecting of the temporal relationship, executing a predetermined function.

2. The method according to claim 1, wherein the act of receiving the radio signals further comprises the act of:
   detecting information in the radio signals which indicate that the radio signals originate from the data glasses, wherein the detected information in the radio signals corresponds to aspects of a radio protocol.

3. The method according to claim 1, wherein the detecting that the data glasses have been brought in proximity of the vehicle comprises the act of:
   determining a distance and/or a position of the data glasses in relation to the vehicle based on a signal strength of the radio signals received by the transmitting and receiving unit, wherein the transmitting and receiving unit comprises a plurality of differently positioned antennas by which the signal strength and/or a direction of origin of the received radio signals are determinable.

4. The method according to claim 1, wherein the act of executing a predetermined function comprises:
   causing an output of a message by a display and/or a loudspeaker of the vehicle;
   receiving information via an input by a user into an input device of the vehicle;
   receiving an input as a response to the message;
   checking whether the input satisfies a predetermined condition; and
   if the input does not satisfy the predetermined condition, then preventing a further function.

5. The method according to claim 4, wherein the further function is one or more of preventing a specific type of data transmission from the vehicle to the data glasses or preventing a starting of the vehicle.

6. The method according to claim 4, wherein the received input comprises detecting that the glasses have been brought into a transmission range of a close-range communication device, wherein the input device is a component of the close-range communication device.

7. A device for a vehicle, comprising:
   a transmitting and receiving unit for wire-free data transmission;
   an electronic computing unit operatively coupled to the transmitting and receiving unit, wherein the electronic computing unit executes a program to:
   receive, via the transmitting and receiving unit, radio signals from data glasses from which no signals had previously been received;
   recognize that the data glasses are in use relative to the vehicle, including detecting a temporal relationship between an operation of the vehicle and the receipt of the radio signals from the data glasses,
   wherein the operating of the vehicle comprises one or more of an unlocking of the vehicle, a movement of windows of the vehicle, an opening of the door of the vehicle or an actuation of an operating element of the vehicle;
   in response to detecting the temporal relationship, execute a predetermined function.

8. The device according to claim 7, wherein the electronic computing unit detects information in the received radio signals which indicates the received radio signals originate from the data glasses, said information corresponding to standards of a radio protocol.

9. The device according to claim 7, wherein the electronic computing unit recognizes that the data glasses have been brought in use relative to the vehicle by:
   determining a distance and/or a position of the data glasses in relation to the vehicle based on a signal strength of the received radio signals, wherein the transmitting and receiving unit has a plurality of antennas at different positions by which the signal strength and/or a direction of origin of the received radio signals is determinable.

10. The device according to claim 7, wherein the predetermined function comprises:
    causing an output of a message via a display and/or a loudspeaker;
    receiving information via an input by a user into an input device;
    receiving an input an as response to the message;
    checking whether the received input satisfies a predetermined condition;
    if the received input does not satisfy the predetermined condition, then preventing a further function.

11. The device according to claim 10, wherein the further function comprises preventing a specific type of data transmission from the vehicle to the data glasses or a preventing a starting of the vehicle.

12. The device according to claim 10, wherein the input received as the response to the message is a detection that the data glasses have been brought into a transmission range of a close-range communication device of the vehicle.

13. A motor vehicle comprising a device according to claim 7.

* * * * *